US011183166B1

(12) United States Patent
Basu et al.

(10) Patent No.: US 11,183,166 B1
(45) Date of Patent: Nov. 23, 2021

(54) VIRTUAL LOCATION NOISE SIGNAL ESTIMATION FOR ENGINE ORDER CANCELLATION

(71) Applicant: Harman International Industries, Incorporated, Stamford, CT (US)

(72) Inventors: Sattwik Basu, Wixom, MI (US); Jeffrey Charles Tackett, Allen Park, MI (US); David Trumpy, Novi, MI (US); James May, Milford, MI (US); Todd Edward Tousignant, Orion, MI (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 0 days.

(21) Appl. No.: 17/091,449

(22) Filed: Nov. 6, 2020

(51) Int. Cl.
*G10K 11/178* (2006.01)
*H04R 3/04* (2006.01)
*B60R 11/02* (2006.01)

(52) U.S. Cl.
CPC .... *G10K 11/17854* (2018.01); *B60R 11/0247* (2013.01); *G10K 11/17883* (2018.01); *H04R 3/04* (2013.01); *H04R 2499/13* (2013.01)

(58) Field of Classification Search
CPC ........ G10K 11/17854; G10K 11/17883; B60R 11/0247; H04R 3/04; H04R 2499/13
See application file for complete search history.

(56) References Cited

U.S. PATENT DOCUMENTS

| 5,381,485 A * | 1/1995 | Elliott | G10K 11/17813 381/71.6 |
|---|---|---|---|
| 5,701,350 A * | 12/1997 | Popovich | G10K 11/1785 381/71.11 |
| 5,748,748 A * | 5/1998 | Fischer | G10K 11/17857 381/71.4 |
| 2019/0051283 A1* | 2/2019 | Malka | G10K 11/17883 |
| 2021/0020156 A1* | 1/2021 | Tachi | G10K 11/17821 |
| 2021/0217401 A1* | 7/2021 | Christian | G10K 11/17813 |

OTHER PUBLICATIONS

Moreau et al., "A Review of Virtual Sensing Algorithms for Active Noise Control", Algorithms 2008, 1, 69-99; DOI: 10.3390/a1020069, Australia, 31 pages.

* cited by examiner

*Primary Examiner* — Fan S Tsang
*Assistant Examiner* — Daniel R Sellers
(74) *Attorney, Agent, or Firm* — Brooks Kushman P.C.

(57) ABSTRACT

A system and method for accurately estimating engine noise at a virtual microphone location, such as an occupant's ear position, in an acoustic space in order to enhance performance of an Engine Order Cancellation (EOC) system is provided. A set of weights and transfer functions that are dependent on various vehicle parameters, such as frequency, load, and speed, may be employed to estimate noise at a position where there are no physical microphones present. The accurate estimation of engine noise at virtual location, such as an occupant's ear position, may be achieved using a frequency dependent weighted sum of filtered and unfiltered error signals measured at microphones mounted at various locations inside an acoustic space, such as a vehicle cabin, which may not be located near virtual location.

20 Claims, 4 Drawing Sheets

VIRTUAL LOCATION NOISE SIGNAL ESTIMATION FOR ENGINE ORDER CANCELLATION

TECHNICAL FIELD

The present disclosure is directed to engine order cancellation and, more particularly, to estimating noise at a virtual microphone location, such as at a location approximating an occupant's ear position in a vehicle cabin.

BACKGROUND

Active Noise Control (ANC) systems attenuate undesired noise using feedforward and feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but out of phase with the noise, combine to reduce the sound pressure level (SPL) at a location. In a vehicle cabin listening environment, potential sources of undesired noise come from the engine, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

An Engine Order Cancellation (EOC) system is a specific ANC system implemented on a vehicle to reduce the level of unwanted vehicle interior noise originating from the narrow band acoustic and vibrational emissions from the vehicle engine and exhaust system or other rotating drivetrain components. EOC systems generate feed forward noise signals based on the engine or other rotating shaft angular speeds, such as revolutions per minute (RPM), and use those signals and adaptive filters to reduce the in-cabin SPL by radiating anti-noise through speakers.

EOC systems are typically Least Mean Square (LMS) adaptive feed-forward systems that continuously adjust adaptive filters based on both an RPM input from a sensor mounted to a drive shaft and on error signals of microphones located in various positions inside the vehicle's cabin.

The adaptive algorithm generates an anti-noise signal to cancel noise at the location of an error microphone instead of the occupant's ear position. The location of the error microphones can impact the EOC system performance. Traditional noise cancellation algorithms rely on the assumption that the cancellation at the error microphone location is closely related to the location of the nearest occupant. This relationship is frequency dependent; the correlation between the physical microphone signal and the occupant's ear decreases as frequency of the noise increases. The decrease in correlation is particularly impactful when the number of error microphones that can be used and the locations in which they can be placed are sub-optimal due to other vehicle requirements and/or constraints.

SUMMARY

In one or more illustrative embodiments, a method of estimating noise at a virtual microphone location for an engine order cancellation (EOC) system is provided. The method may include receiving a plurality of estimated noise signals indicative of noise at a location of each of a plurality of error microphones. Each estimated noise signal may be based at least in part on an error signal from each of the plurality of error microphones. The method may further include filtering each estimated noise signal using a virtual path filter modeled according to a transfer function between each corresponding error microphone location and the virtual microphone location to generate a plurality of filtered estimated noise signals. The method may further include adaptively weighting each filtered estimated noise signal using a weight that varies based on current vehicle conditions to generate a plurality of weighted filtered estimated noise signals. The method may further include generating an estimated virtual microphone noise signal indicative of noise at the virtual microphone location based on a superposition of at least the plurality of weighted filtered estimated noise signals.

Implementations may include one or more of the following features. Each virtual path filter may be a finite impulse response filter. Moreover, each weight may be selected from a plurality of weights stored in a lookup table and derived for application to individual filtered estimated noise signals based on the current vehicle conditions. Additionally, the virtual microphone location may correspond to an occupant's ear position.

The method may further include receiving the estimated virtual microphone noise signal at an adaptive filter controller and adjusting an adaptive transfer characteristic of an adaptive filter based in part on the estimated virtual microphone noise signal. The current vehicle conditions may include a frequency of engine order noise such that each weight varies based at least on the frequency. The current vehicle conditions may further include at least one of engine load and vehicle speed such that each weight is further selected based on at least one of the engine load and the vehicle speed.

Each of the plurality of estimated noise signals may be split into two signals paths including a first signal path and a second signal path. An output of the second signal path may include the plurality of weighted filtered estimated noise signals. To this end, the method may further include adaptively weighting each estimated noise signal in the first signal path using a weight selected based on the current vehicle conditions to generate a plurality of weighted estimated noise signals. Moreover, generating the estimated virtual microphone noise signal indicative of noise at the virtual microphone location based on a superposition of at least the plurality of weighted filtered estimated noise signals may include generating the estimated virtual microphone noise signal indicative of noise at the virtual microphone location based on a superposition of the plurality of weighted estimated noise signals from the first signal path and the plurality of weighted filtered estimated noise signals from the second signal path.

One or more additional embodiments may be directed to an EOC system including at least one adaptive filter, an adaptive filter controller, and a virtual location noise estimator. The adaptive filter may be configured to generate an anti-noise signal based on an adaptive transfer characteristic and a reference signal received from a reference signal generator. The adaptive transfer characteristic of the at least one adaptive filter may be characterized by a set of filter coefficients. The adaptive filter controller, including a processor and memory, may be programmed to adapt the set of filter coefficients based on the reference signal and an estimated virtual microphone noise signal indicative of noise at a virtual microphone location. The virtual location noise estimator may be in communication with at least the adaptive filter controller.

The virtual location noise estimator may include a processor and memory programmed to receive a plurality of estimated noise signals indicative of noise at a location of each of a plurality of error microphones. Each estimated noise signal may be based at least in part on an error signal from each of the plurality of error microphones. The virtual location noise estimator may be further programmed to filter each estimated noise signal using a virtual path filter modeled according to a transfer function between each corresponding error microphone location and the virtual microphone location to generate a plurality of filtered estimated noise signals. The virtual location noise estimator may be further programmed to adaptively weight each filtered estimated noise signal using a weight selected and varied based on current vehicle conditions to generate a plurality of weighted filtered estimated noise signals. The virtual location noise estimator may be further programmed to generate the estimated virtual microphone noise signal indicative of noise at the virtual microphone location based on a superposition of at least the plurality of weighted filtered estimated noise signals.

Implementations may include one or more of the following features. Each weight may be selected from a plurality of weights derived for application to individual filtered estimated noise signals based on the current vehicle conditions. The current vehicle conditions may include a frequency of engine order noise and each weight varies based at least on the frequency. Each virtual path filter may be a finite impulse response filter. Each of the plurality of estimated noise signals may be split into two signals paths including a first signal path and a second signal path, wherein an output of the second signal path includes the plurality of weighted filtered estimated noise signals. In this regard, the virtual location noise estimator may be further programmed to adaptively weight each estimated noise signal in the first signal path using a weight selected based on the current vehicle conditions to generate a plurality of weighted estimated noise signals. Moreover, the virtual location noise estimator may be programmed to generate the estimated virtual microphone noise signal indicative of noise at the virtual microphone location based on a superposition of the plurality of weighted estimated noise signals from the first signal path and the plurality of weighted filtered estimated noise signals from the second signal path. The virtual microphone location may be a fixed point in space, distanced from the plurality of error microphones, corresponding to an occupant's ear position.

One or more additional embodiments may be directed to a method of estimating noise at a virtual microphone location for an EOC system. The method may include receiving a plurality of estimated noise signals indicative of noise at a location of each of a plurality of error microphones, wherein each estimated noise signal is based at least in part on an error signal from each of the plurality of error microphones. The method may further include transmitting each estimated noise signal along a first signal path and a second signal path. The method may further include applying a weight to each estimated noise signal in the first signal path, each weight being individually selected and varied based on current vehicle conditions, to generate a plurality of weighted estimated noise signals. The method may further include filtering each estimated noise signal in the second signal path using a virtual path filter modeled according to a transfer function between each corresponding error microphone location and the virtual microphone location to generate a plurality of filtered estimated noise signals. The method may further include applying a weight to each filtered estimated noise signal in the second signal path, each weight being individually selected and varied based on current vehicle conditions, to generate a plurality of weighted filtered estimated noise signals. The method may further include generating an estimated virtual microphone noise signal indicative of noise at the virtual microphone location based on a superposition of the plurality of weighted estimated noise signals from the first signal path and the plurality of weighted filtered estimated noise signals from the second signal path.

Implementations may include one or more of the following features. A proportion of each signal applied in the superposition may be adaptively controlled by its corresponding weight based on the current vehicle conditions. The current vehicle conditions may include a frequency of engine order noise such that each weight is individually selected and varied based at least on the frequency. The virtual microphone location may correspond to an occupant's ear position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
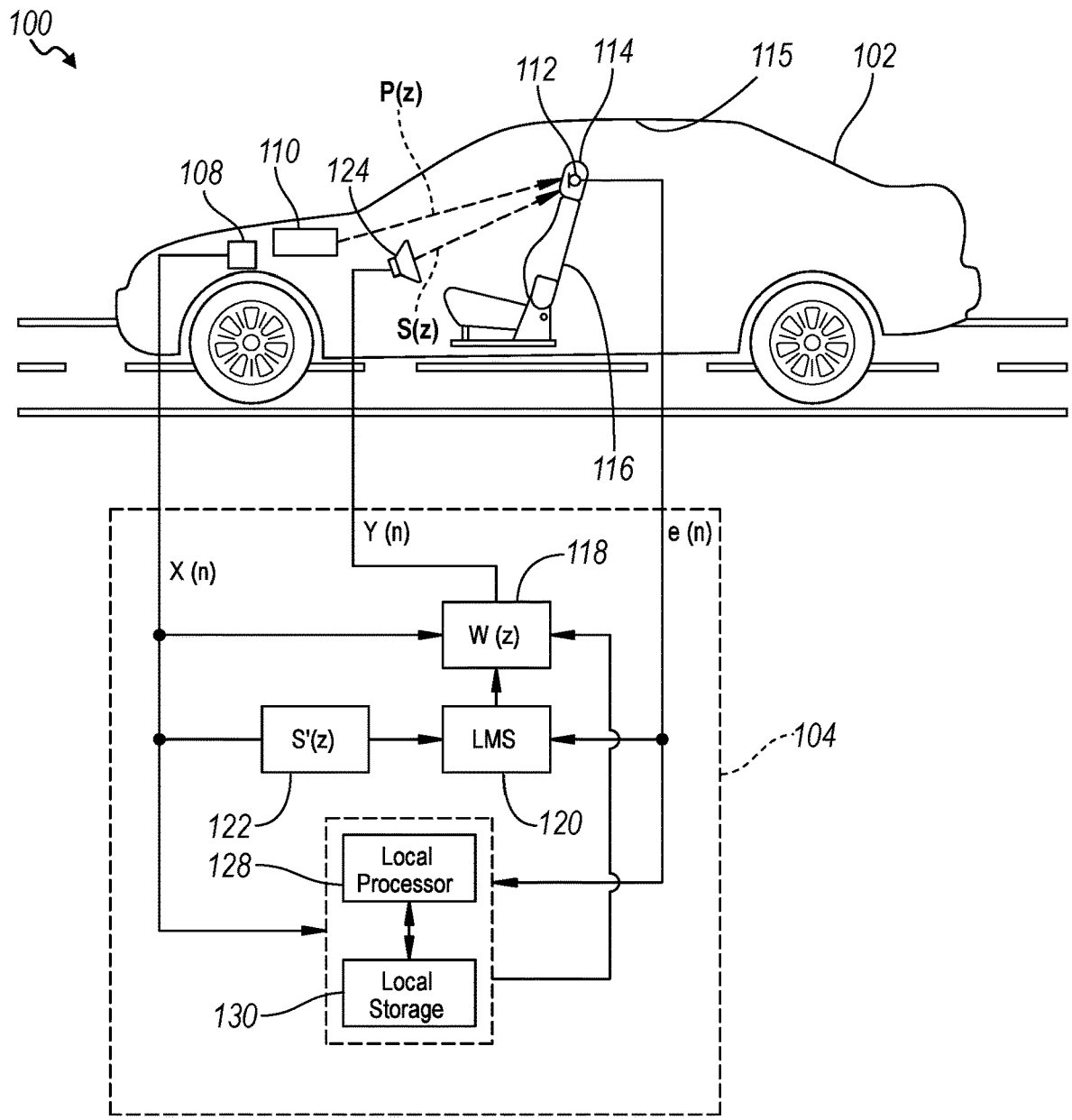
FIG. 1 is an environmental block diagram of a vehicle having an engine order cancellation (EOC) system, in accordance with one or more embodiments of the present disclosure.

FIG. 1 is an environmental diagram showing an engine order cancellation (EOC) system 100 for a vehicle 102 having a reference signal generator 108. The reference signal generator 108 may generate reference signals x[n] corresponding to audible engine order noise for each engine order originating from a vehicle engine and exhaust system 110. The EOC system 100 may be integrated with a feedforward and feedback active noise control (ANC) framework or system 104 that generates anti-noise by adaptive filtering of the reference signals x[n] from reference signal generator 108 using one or more microphones 112. An anti-noise signal y[n] may then be played through one or more speakers 124. S(z) represents a transfer function between a single speaker 124 and a single microphone 112. While FIG. 1 shows a single reference signal generator 108, microphone 112, and speaker 124 for simplicity purposes only, it should be noted that typical EOC systems can include multiple engine order noise reference signal generators 108, in addition to multiple speakers 124 (e.g., 4 to 8), and multiple microphones 112 (e.g., up to 8).

Figure 2:
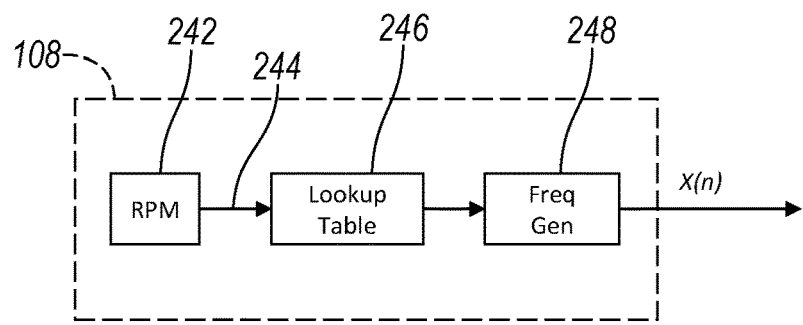
FIG. 2 is a detailed view of a reference signal generator depicted in FIG. 1, in accordance with one or more embodiments of the present disclosure.

With reference to FIG. 2, the reference signal generator 108 may include an RPM sensor 242, which may provide an RPM signal 244 (e.g., a square-wave signal) indicative of rotation of an engine drive shaft or other rotating shaft indicative of the engine rotational speed. In some embodiments, the RPM signal 244 may be obtained from a vehicle network bus (not shown), such as a Controller Area Network (CAN) bus. As the radiated engine orders are directly proportional to the drive shaft RPM, the RPM signal 244 is representative of the frequencies produced by the drivetrain, including the engine and exhaust system. Thus, the signal from the RPM sensor 242 may be used to generate reference engine order signals corresponding to each of the engine orders for the vehicle. Accordingly, the RPM signal 244 may be used in conjunction with a lookup table 246 of Engine Order Frequency vs. RPM.

More specifically, the lookup table 246 may be used to convert the RPM signal 244 into one or more engine order frequencies. The frequency of a given engine order at the sensed RPM, as retrieved from the lookup table 246, may be supplied to a frequency generator 248, thereby generating a sine wave at the given frequency. This sine wave represents a reference signal x[n] indicative of engine order noise for a given engine order. The frequency generator 248 may be an oscillator, such as a quadrature oscillator, or any similar device for generating a sinusoidal reference signal indicative of engine order noise. As there may be multiple engine orders, the EOC system 100 may include multiple reference signal generators 108 and/or frequency generators 248 for generating a reference signal x[n] for each engine order based on the RPM signal 244.

An engine rotating at a rate of 1800 RPM can be said to be running at 30 Hz (1800/60=30), which corresponds to the fundamental or primary engine order frequency. For a four-cylinder engine, two cylinders are fired during each crank revolution, resulting in the 60-Hz (30×2=60) dominant frequency that defines the four-cylinder engine's sound at 1800 RPM. In a four-cylinder engine, it's also called the "second engine order" because the frequency is two times that of the engine's rotational rate. At 1800 RPM, the other dominant engine orders of a four-cylinder engine are the $4^{th}$ order, at 120 Hz, and the $6^{th}$ order, at 180 Hz. In a six-cylinder engine, the firing frequency results in a dominant third engine order; in a V-10, it's the fifth engine order that is dominant. As the RPM increases, the firing frequency rises proportionally. As previously described, the EOC system 100 may include multiple reference signal generators 108 and/or frequency generators 248 for generating a reference signal x[n] for each engine order based on an RPM signal 244. Further, the ANC framework 104 (e.g., adaptive filter 118, adaptive filter controller 120, secondary path filter 122) within the EOC system 100 may be scaled to reduce or cancel each of these multiple engine orders. For instance, an EOC system that reduces the $2^{nd}$, $4^{th}$ and $6^{th}$ engine orders requires three of the ANC frameworks or subsystems 104, one for each engine order. Certain system components such as the error microphones 112 and the anti-noise speakers 124 may be common to all systems or subsystems.

Referring back to FIG. 1, the characteristic frequencies of noise and vibrations that originate from the engine and exhaust system 110 may be sensed by one or more of the RPM sensors 242 optionally contained within the reference signal generator 108. The reference signal generator 108 may output a reference signal x[n], which is a signal that represents a particular engine order frequency. As previously described, reference signals x[n] are possible at different engine orders of interest. Moreover, these reference signals may be used separately or may be combined in various ways known by those skilled in the art. The reference signal x[n] may be filtered with a modeled transfer characteristic S'(z), which estimates the secondary path (i.e., the transfer function between an anti-noise speaker 124 and an error microphone 112), by a secondary path filter 122.

Drivetrain noise (e.g., engine, drive shaft, or exhaust noise) is transferred, mechanically and/or acoustically, into the passenger cabin and is received by the one or more microphones 112 inside the vehicle 102. The one or more microphones 112 may, for example, be located in a headrest 114 of a seat 116 as shown in FIG. 1. Alternatively, the one or more microphones 112 may be located in a headliner 115 of the vehicle 102, or in some other suitable location to sense the acoustic noise field heard by occupants inside the vehicle 102. The engine, driveshaft and/or exhaust noise is transferred to the microphone 112 according to a transfer characteristic P(z), which represents the primary path (i.e., the transfer function between actual noise sources and an error microphone).

The microphones 112 may output an error signal e[n] representing the noise present in the cabin of the vehicle 102 as detected by the microphones 112. In the EOC system 100, an adaptive transfer characteristic W(z) of adaptive filter 118 may be controlled by adaptive filter controller 120. The adaptive filter controller 120 may operate according to a known least mean square (LMS) algorithm based on the error signal e[n] and the reference signal x[n], which is optionally filtered with the modeled transfer characteristic S'(z) by the filter 122. The adaptive filter 118 is often referred to as a W-filter. The LMS adaptive filter controller 120 may update the transfer characteristic W(z) filter coefficients based on the error signals e[n]. The process of adapting or updating W(z) that results in improved noise cancellation is referred to as convergence. Convergence refers to the creation of adaptive filters that minimize the error signals e[n], which is controlled by a step size governing the rate of adaption for the given input signals. The step size is a scaling factor that dictates how fast the algorithm will converge to minimize e[n] by limiting the magnitude change of the adaptive filter coefficients based on each update of the adaptive filter 118.

The anti-noise signal y[n] may be generated by an adaptive filter formed by the adaptive filter 118 and the adaptive filter controller 120 based on the identified transfer characteristic W(z) and the reference signal, or a combination of reference signals, x[n]. The anti-noise signal y[n] ideally has a waveform such that when played through the speaker 124, anti-noise is generated near the occupants' ears and the microphone 112 that is substantially out of phase and identical in magnitude to that of the engine order noise audible to the occupants of the vehicle cabin. The anti-noise from the speaker 124 may combine with engine order noise in the vehicle cabin near the microphone 112 resulting in a reduction of engine order noise-induced sound pressure levels (SPL) at this location. In certain embodiments, the EOC system 100 may receive sensor signals from other acoustic sensors in the passenger cabin, such as an acoustic energy sensor, an acoustic intensity sensor, or an acoustic particle velocity or acceleration sensor to generate error signal e[n].

Vehicles often have other shafts rotating at other rates relative to the engine RPM. For example, the driveshaft rotates at a rate related to the engine by the current gear ratio set by the transmission. A driveshaft may not have a perfect rotating balance, as it may have some degree of eccentricity. When rotated, the eccentricity gives rise to a rotating imbalance that imparts an oscillating force on the vehicle, and these vibrations may result in audible acoustic sound in the passenger cabin. Other rotating shafts that rotate at a rate different than the engine include the half shafts, or axels, that rotate at a rate set by the gear ratio in their differentials. In certain embodiments, the reference signal generator 108 can have an RPM sensor on a different rotating shaft, such as a drive shaft or half shafts.

While the vehicle 102 is under operation, a processor 128 may collect and optionally processes the data from the RPM sensor 242 in the reference signal generator 108 and the microphones 112 to construct a database or map containing data and/or parameters to be used by the vehicle 102. The data collected may be stored locally at a storage 130, or in the cloud, for future use by the vehicle 102. Examples of the types of data related to the EOC system 100 that may be useful to store locally at storage 130 include, but are not limited to, RPM history, microphone spectra or time dependent signals, microphone-based acoustic performance data, EOC tuning parameters and dominant engine orders based on drive mode, and the like. In addition, the processor 128 may analyze the RPM sensor and microphone data and extract key features to determine a set of parameters to be applied to the EOC system 100. The set of parameters may be selected when triggered by an event. In one or more embodiments, the processor 128 and storage 130 may be integrated with one or more EOC system controllers, such as the adaptive filter controller 120.

The simplified EOC system schematic depicted in FIG. 1 shows one secondary path, represented by S(z), between each speaker 124 and each microphone 112. As previously mentioned, EOC systems typically have multiple speakers, microphones and reference signal generators. Accordingly, a 6-speaker, 6-microphone EOC system will have 36 total secondary paths (i.e., 6×6). Correspondingly, the 6-speaker, 6-microphone EOC system may likewise have 36 S'(z) filters (i.e., secondary path filters 122), which estimate the transfer function for each secondary path. As shown in FIG. 1, an EOC system will also have one W(z) filter (i.e., adaptive filter 118) between each reference signal x[n] from a reference signal generator 108 and each speaker 124. Accordingly, a 5-reference signal generator, 6-speaker EOC system may have 30 W(z) filters. Alternately, a 6-frequency generator 248, 6-speaker EOC system may have 36 W(z) filters.

As previously discussed, narrowband engine noise cancellation systems may use multiple error microphones mounted in vehicle headliners or other locations to provide feedback to an adaptive algorithm. In traditional systems, the algorithm generates anti-noise to cancel noise at the error microphone locations instead of an occupant's ear position. Due to certain vehicle manufacturing and design requirements or constraints, the number of error microphones that can be used and the locations in which they are placed may be sub-optimal. Vehicle manufacturers place microphones in the cabin for multiple functions, which have different requirements for optimal placement. For instance, the optimal placement for noise cancellation microphones may not coincide with the optimal placement for hands-free voice communication microphones, such as those for making telephone calls. Noise cancellation microphones tend to be located within 1/10 of a wavelength of the occupant's location and, thus, are often placed directly above the occupant's head or in the headrest. Design constraints, such as the presence of a sunroof or moonroof, can often prohibit optimal EOC error microphone placement. Hands-free telephone voice call microphones, on the other hand, are placed to optimally detect the speaker's voice. These microphones are usually placed directly in front of the occupant's head, typically on a fixed location in the vehicle interior such as a rear-view mirror or dashboard.

The location of the noise cancellation (error) microphones can impact EOC performance. Traditional noise cancellation algorithms rely on the assumption that the cancellation at an error microphone location is closely related to the location of the nearest occupant. This relationship, however, is frequency dependent. The correlation between noise signals at the ear position and the error microphone decreases as the frequency of the noise and the distance between the positions increases. Thus, in scenarios where the number of error microphones that can be used and the locations in which they are placed may be sub-optimal, accurately estimating noise at the occupant's ear positions may help ensure EOC performance is not compromised.

Existing techniques for obtaining an estimate of the noise at an occupant's ear position may be suitable in simple acoustic spaces with stationary frequency noise (e.g., laboratory conditions), but may be unreliable when applied to automotive applications with dynamic frequency noise and acoustics. One or more embodiments of the present disclosure is directed to systems and methods for more accurately predicting non-stationary, narrowband engine order noise at the ear positions in a complex acoustic environment such as a vehicle's cabin. The techniques described in this disclosure may allow for a more reliable estimation of the noise at the occupant's ear position, referred to as a virtual microphone location, based on the signal from the physical error microphone location. These techniques may employ a set of weights and transfer functions that are dependent on various vehicle parameters or conditions, such as frequency, load, and speed, to estimate noise at an occupant's ear position where there are no microphones present.

The systems and methods of the present disclosure model the acoustics in a highly reverberant environment such as a vehicle cabin. As previously described, engine noise typically originates from the vehicle's intake and exhaust. The acoustic waves propagate through the vehicle cabin in both a direct path, and a path that can have many reflections before summing at the occupant's ear location. To optimize cancellation performance, the signals at the physical error microphones can then be used along with an acoustic model to estimate the signal at a virtual microphone location remote from the physical error microphones, such as the approximate location of the occupant's ear position. This relationship may be modeled as a path from the error microphone, a physical location (P), to the occupant's ear position, a virtual location (V).

Figure 3:
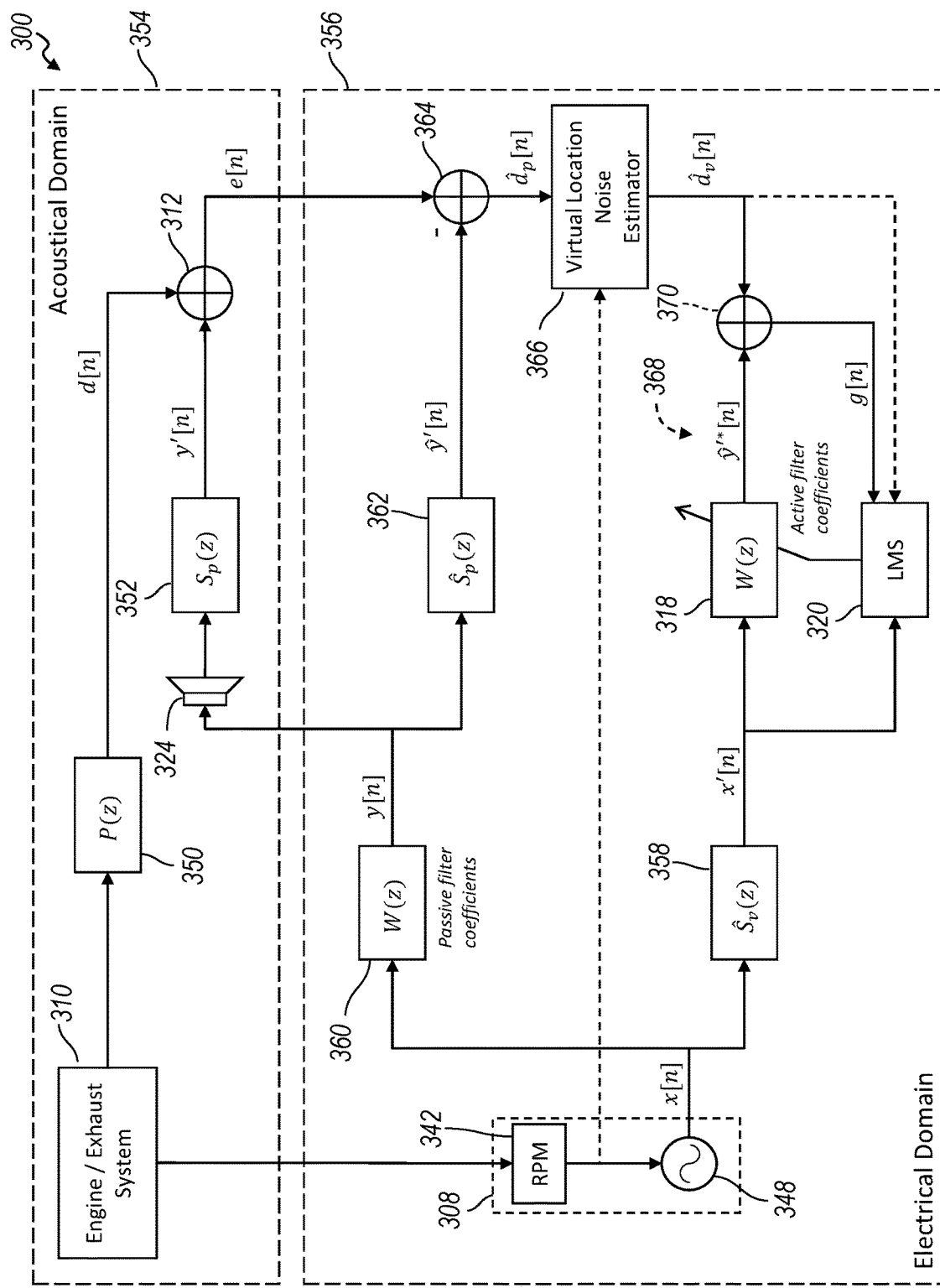
FIG. 3 is a schematic block diagram representing an EOC system including a virtual location noise estimator, in accordance with one or more embodiments of the present disclosure.

FIG. 3 is a schematic block diagram representing an EOC system 300, in accordance with one or more embodiments of the present disclosure. The EOC system 300 may be a Modified Filtered-x Least Mean Squares (MFxLMS) EOC system, as understood by those of ordinary skill in the art. The EOC system 300 may correspondingly employ an MFxLMS adaptive algorithm for narrowband engine noise cancellation. One or more aspects of the present disclosure may, however, be employed using other types of LMS-based EOC systems, such as Filtered-x Least Mean Squares (FxLMS) systems and the like.

The EOC system 300 may include similar elements to the EOC system 100 shown and described in connection with the environmental diagram of FIG. 1. For instance, the EOC system 300 may include a reference signal generator 308, including at least an RPM sensor 342 and frequency generator 348 (depicted as an oscillator), for generating a sinusoidal engine order noise reference signal x[n] having frequencies characteristic of noise and vibrations that originate from the engine and exhaust system 310. Like FIG. 1, the EOC system 300 is shown having one reference signal generator 308, one error microphone 312, and one speaker 324 for ease of explanation. In application, the EOC system 300 may be a scalable, multiple-input-multiple-output (MIMO) system that operates for multiple engine orders, multiple speaker outputs, and multiple error microphones. The EOC system 300 may also be scaled to estimate noise signals at multiple virtual microphone locations (e.g., occupant ear positions), as will be described in greater detail below.

In the schematic block diagram of FIG. 3, the error microphone 312 is depicted as an adder (or summing operator/element). Further, the transfer functions for the actual primary path P(z) and actual secondary path $S_p(z)$ are represented in block form using elements 350 and 352, respectively. FIG. 3 also depicts a division of elements between an acoustical domain 354 and an electrical domain 356 for illustrative purposes.

The reference signal x[n] may be filtered by a first secondary path filter 358. The first secondary path filter 358 may filter the reference signal x[n] using a modeled transfer characteristic $\hat{S}_v(z)$, which estimates the secondary path (i.e., the transfer function) between the anti-noise speaker 324 and a virtual microphone location representing an occupant's ear position, to generate a filtered reference signal x'[n]. Like the EOC system 100, the EOC system 300 may include a first adaptive filter 318 and an adaptive filter controller 320. An adaptive transfer characteristic W(z) of the first adaptive filter 318 may be controlled by adaptive filter controller 320 according to the LMS-based adaptive algorithm based in part on the filtered reference signal x'[n]. The adaptive filter controller 320 may actively update the filter coefficients of the first adaptive filter 318 to improve noise cancellation. The filter coefficients of the first adaptive filter 318 may be referred to as active filter coefficients. The EOC system 300 may include a second adaptive filter 360 also having an adaptive transfer characteristic W(z) characterized by a set of filter coefficients. The second adaptive filter 360 may be a copy of the first adaptive filter 318. Accordingly, the filter coefficients of the second adaptive filter 360 may be referred to as passive filter coefficients.

As shown, the reference signal x[n] may also be filtered by the second adaptive filter 360 to generate an actual anti-noise signal y[n]. The second adaptive filter 360, controlled by the adaptive filter controller 320 through a set of filter coefficients, may produce the anti-noise signal y[n] according to the adaptive algorithm. In the acoustical domain, the anti-noise signal y[n] may be converted to sound through the speaker 324. As previously described, the actual secondary path $S_p(z)$, denoted by block 352, represents the transfer function between the speaker 324 and the error microphone 312. The signal y'[n] denotes the audible anti-noise at the physical error microphone 312 filtered by the actual secondary path $S_p(z)$, referred to as actual error microphone anti-noise y'[n]. The actual error microphone anti-noise y'[n] may be combined with primary noise d[n] from the engine and exhaust system 310, as filtered by the actual primary path P(z) (denoted by block 350), at the error microphone 312. The error microphone 312 may output an error signal e[n] indicative of the remaining engine noise present in the vehicle cabin (i.e., the noise not cancelled by the anti-noise).

In the electrical domain, the anti-noise signal y[n] may be filtered by a second secondary path filter 362 to generate an estimated anti-noise signal ŷ'[n]. The second secondary path filter 362 may filter the anti-noise signal y[n] using a modeled transfer characteristic $\hat{S}_p(z)$, which estimates the secondary path (i.e., the transfer function) between the anti-noise speaker 324 and the error microphone 312. The estimated anti-noise signal ŷ'[n] may, thus, be indicative of estimated anti-noise at the physical location of the error microphone 312. The estimated anti-noise signal ŷ'[n] may be subtracted from the error signal e[n] at adder 364, as shown, to generate an estimated noise signal at the error microphone 312, or simply estimated noise signal $\hat{d}_p[n]$. The estimated noise signal $\hat{d}_p[n]$ may provide an estimate of the engine noise at a physical error microphone location.

To estimate the engine noise at a virtual microphone location, such as an occupant's ear position, the EOC system 300 may further include a virtual location noise estimator 366. The virtual location noise estimator 366 may include an acoustic model to provide an improved estimation of the noise at virtual microphone location, such as a location representing an occupant's ear position, based on the signal from a physical microphone location, i.e., the estimated noise signal $\hat{d}_p[n]$. Thus, the virtual location noise estimator 366 models the path from the one or more physical locations of the error microphones 312 to a virtual location representing the occupant's ear position. As a result, the virtual location noise estimator 366 may output an estimated virtual microphone noise signal $\hat{d}_v[n]$, which provides an estimate of the engine noise at a virtual microphone location (e.g., an occupant's ear location). As previously discussed, accurately predicting non-stationary narrowband noise at a virtual location, such as an occupant's ear position, is difficult in complex, dynamic acoustic environments like vehicle cabins. According to one or more embodiments of the present disclosure, the virtual location noise estimator 366 may employ a set of weights and transfer functions that are dependent of various vehicle parameters or conditions, such as frequency, load and speed, to estimate the engine noise at an occupant's ear position (i.e., the virtual microphone location). Accordingly, as shown, the RPM signal or the frequency derived from the RPM signal at the reference signal generator 308 may be provided to the virtual location noise estimator 366.

Figure 4:
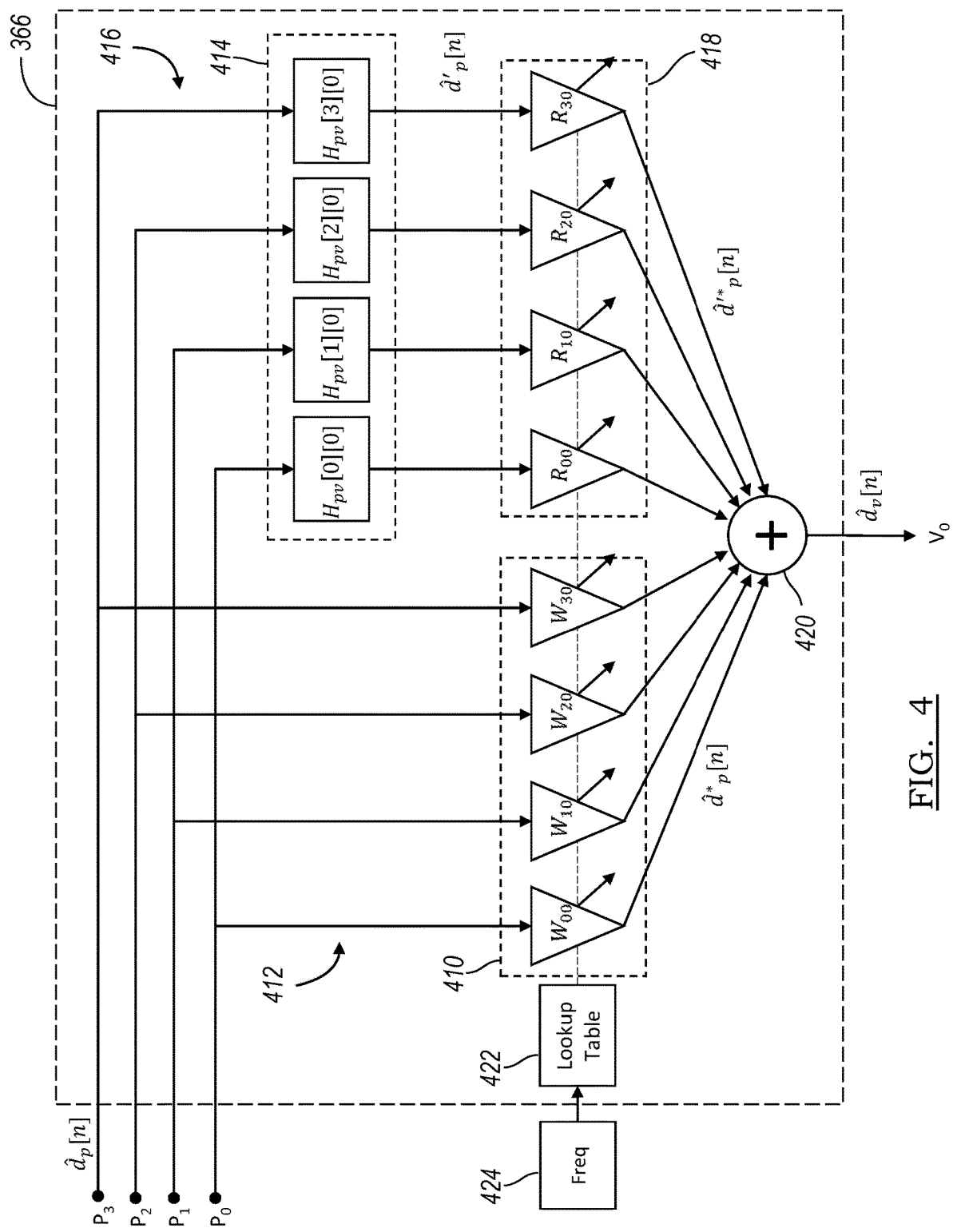
FIG. 4 is an expanded block diagram of the virtual location noise estimator depicted in FIG. 3, in accordance with one or more embodiments of the present disclosure.

FIG. 4 is an expanded block diagram of the virtual location noise estimator 366, according to one or more embodiments of the present disclosure. A relatively large frequency range may be divided into multiple frequency bins, with each frequency bin constituting a relatively narrow range of frequencies. The example implementation of the virtual location noise estimator 366 shown in FIG. 4 depicts the estimation of noise at a single virtual microphone location (e.g., an occupant's ear location), for one engine order and at one frequency bin, using noise signals from four physical error microphones. However, this concept can support an arbitrary number of physical microphones and virtual microphones (e.g., ear positions) and can be further scaled to account for multiple engine orders and frequency bins.

As shown, the virtual location noise estimator 366 in FIG. 4 may provide an estimated virtual microphone noise signal $\hat{d}_v[n]$ at a first virtual microphone location, $V_0$, based on the estimated noise signals $\hat{d}_p[n]$ measured at the four physical error microphones, $P_0, P_1, P_2, P_3$. The virtual location noise estimator 366 may include a first set of weights 410, denoted by $W_{pv}$, applied to the signals between each physical microphone and each virtual microphone. The estimated noise signals $\hat{d}_p[n]$ measured at the four physical error microphones ($P_0, P_1, P_2, P_3$) may be split into two signal paths. The estimated noise signals $\hat{d}_p[n]$ in a first signal path 412 may be used as direct inputs to the first set of weights 410 (e.g., $W_{00}, W_{10}, W_{20}, W_{30}$) to generate weighted estimated noise signals $\hat{d}^*_p[n]$.

The virtual location noise estimator 366 may further include a set of virtual path filters 414, denoted by $H_{pv}[p][v]$, which generally represent transfer functions from each physical error microphone (P) to each virtual microphone (V) representing an occupant's ear position. The virtual path filters 414 may be finite impulse response (FIR) filters and may be designed using a deconvolution process. For instance, during a design and calibration process for a particular vehicle environment, signals from actual microphones at the error microphone positions and approximated occupant ear positions may be first measured and then a deconvolution process may be used to determine the transfer function $H_{pv}[p][v]$ between each physical error microphone location and each ear position (virtual microphone location). The transfer functions $H_{pv}[p][v]$ may be finally converted to digital FIR filters and then used in the EOC system 300, and corresponding adaptive algorithm, as virtual path filters 414 in the virtual location noise estimator 366. The estimated noise signals $\hat{d}_p[n]$ in a second signal path 416 may be filtered by the set of virtual path filters 414 to generate filtered estimated noise signals $\hat{d}'_p[n]$ for each of the four physical error microphones ($P_0, P_1, P_2, P_3$).

Each virtual microphone location may be a predetermined fixed point in space distanced from a physical microphone or sensor, such as the error microphones 312. The virtual microphone location may correspond to the location of an occupant's ear position. In some embodiments, the virtual microphone location may represent an occupant's ear position for an average passenger. In certain other embodiments, each virtual microphone location may be adjusted to accommodate different types of passengers and/or different vehicle configurations. For instance, the virtual microphone location may be customized using occupant settings to better estimate an occupant's ear position based on occupant characteristics, such as torso height, as well as seat position settings. As another example, in vehicles with more flexible cabin configurations, such as those configured for autonomous driving, one or more virtual microphone locations may be adjusted based on whether the vehicle is in an autonomous driving mode.

According to one or more embodiments, a virtual microphone location may be determined from a set of virtual microphone locations selected based on occupant head tracking. For instance, a position of an occupant's head may be sensed, and the virtual microphone location adjusted based on a current head position. In embodiments where a virtual microphone location may be adjusted, the corresponding virtual path filters 414 may be likewise adapted or modified to represent the appropriate transfer functions from each error microphone location to each adjustable virtual microphone location. As an example, a virtual path filter 414 may be designed, calibrated and stored for the paths between each error microphone 312 and multiple virtual microphone locations associated with each occupant. The appropriate virtual path filters 414 may then be selected based on the current virtual microphone locations, whether selected by an occupant through system settings or sensed via head position tracking.

The virtual location noise estimator 366 may also include a second set of weights 418, denoted by $R_{pv}$, which may be applied to the signals between each filtered physical microphone and each virtual microphone. The filtered estimated noise signals $\hat{d}'_p[n]$ may be used as direct inputs to the second set of weights 418 (e.g., $R_{00}, R_{10}, R_{20}, R_{30}$) to generate weighted filtered estimated noise signals $\hat{d}'^*_p[n]$.

According to one or more embodiments, the final estimated virtual microphone noise signal $\hat{d}_v[n]$ at the first virtual microphone location, $V_0$, may be generated from a superposition of all the signals in the two signal paths (i.e., the filtered and unfiltered noise signals) at adder 420. The proportion of each signal applied in the superposition may be controlled by the weights, WP, and $R_{pv}$, respectively. The EOC system 300 may adaptively adjust these weights based on vehicle parameters or conditions, such as frequency. For instance, the acoustic response of a vehicle's cabin to excitation by the engine noise varies with frequency. In addition, the EOC system and adaptive algorithm deals with tonal noise where the signal statistics, unlike in broadband noise, change rapidly with frequency. The weights 410 and 418 applied by the virtual location noise estimator 366, therefore, may also vary with respect to frequency to account for variations in magnitude and phase of the noise signals being summed together.

The selectable, frequency-dependent weights may be derived during system design and calibration. Signals measured at the error microphones and the virtual microphone locations (e.g., occupants' ear locations), for each error microphone and virtual microphone location combination, may be split into entries in a table of frequency bins of a predetermined range. For instance, each frequency bin may be 3 Hz wide. The weights, both $W_{pv}$ and $R_{pv}$, for each frequency bin may then be calculated using an adaptive algorithm such as LMS. Using this method, a set of frequency-dependent weights may be derived that are optimized until a residual error is minimized to a value below a defined threshold. Thus, the virtual location noise estimator 366 may further include a lookup table 422 of weights, $W_{pv}$ and $R_{pv}$, for each error microphone and virtual microphone location combination, with the entries for each weight being divided by frequency bin. The lookup table 422 may receive a frequency value 424 of the engine order noise and output the appropriate weights, $W_{pv}$ and $R_{pv}$, to be adaptively applied to each unfiltered and filtered estimated noise signal based on the frequency. The frequency of the engine order noise may originate from the reference signal generator 308, as shown in FIG. 3. During EOC operation, as the engine noise frequency changes, the weights may be selected from the appropriate frequency bin according to the lookup table 422 and applied by the virtual location noise estimator 366. In one or more alternate implementations, the adaptive weights can also be a function of engine load, vehicle speed, and other vehicle parameters or conditions, instead of, or in addition to, frequency.

Mixing filtered and unfiltered error microphone signals and adaptively weighting them based on current vehicle parameters, such as frequency, load, and/or speed, may provide accurate and reliable estimates of non-stationary narrowband noise at a virtual microphone location (e.g., an occupant's ear position) in a complex and dynamic acoustic environment, such as a vehicle cabin. Alternatively, the final estimated virtual microphone noise signal $\hat{d}_v[n]$ at a virtual microphone location may be generated from a superposition of only the weighted estimated noise signals $\hat{d}*_p[n]$, i.e. the superposition of noise signals along the first signal path 412. According to yet another embodiment, the final estimated virtual microphone noise signal $\hat{d}_v[n]$ at a virtual microphone location may be generated from a superposition of only the weighted filtered estimated noise signals $\hat{d}'*_p[n]$, i.e. the superposition of noise signals along the second signal path 416.

Referring back to FIG. 3, the estimated virtual microphone noise signals $\hat{d}_v[n]$ may be given as feedback to the adaptive filter controller 320, which is then used to adaptively update the filter coefficients for the adaptive filters 318 and 360. According to one or more embodiments, the EOC system 300 may include an internal error loop 368 for the LMS-based adaptive filter controller 320. In such cases, the estimated virtual microphone noise signal $\hat{d}_v[n]$ may be combined with an internal anti-noise signal $\hat{y}'*[n]$ at adder 370 to generate an internal error signal $g[n]$. The internal error signal $g[n]$ may then be given as feedback to the adaptive filter controller 320. The internal error loop 368 may be employed in an MFxLMS system to adapt the adaptive filter 318 using a relatively simple LMS algorithm, which can hasten convergence by avoiding delays introduced by other LMS-based systems. For instance, the internal error loop 368 may allow for the handling of larger step sizes as compared to other LMS algorithms, thereby achieving faster convergence.

Figure 5:
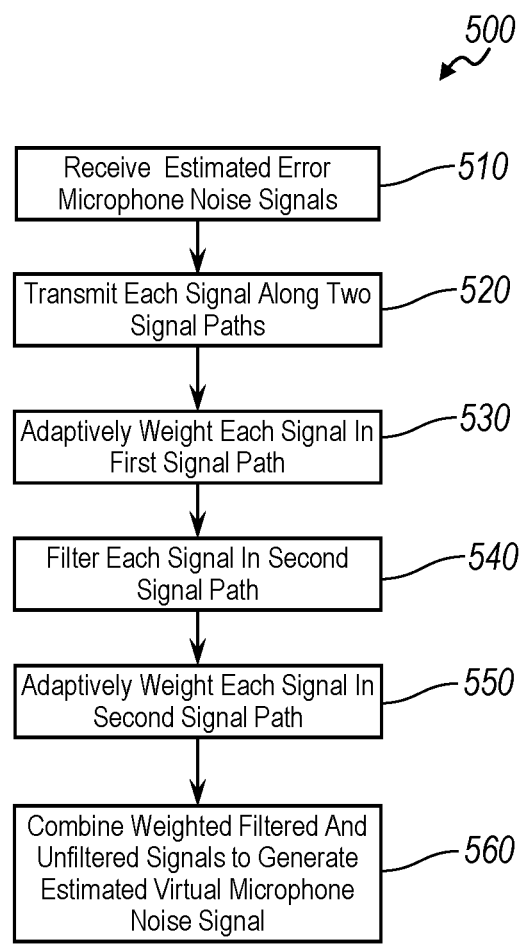
FIG. 5 is an exemplary flowchart depicting a method for estimating noise at a location proximate to an occupant's ear, in accordance with one or more embodiments of the present disclosure.

FIG. 5 is a flowchart depicting a method 500 of estimating noise at a virtual microphone location for an EOC system, such as EOC system 300. One or more of the steps for estimating noise at a virtual location may be performed by the virtual location noise estimator 366. For instance, the virtual location noise estimator 366 may receive a plurality of estimated noise signals $\hat{d}_p[n]$, as provided at step 510. Each estimated noise signal $\hat{d}_p[n]$ may be based, at least in part, on an error signal $e[n]$ from each of a plurality of error microphones 312. According to one or more embodiments of the present disclosure, the plurality of estimated noise signals $\hat{d}_p[n]$ may be split into two signal paths such that each estimated noise signals $\hat{d}_p[n]$ may be transmitted along both the first signal path 412 and the second signal path 416, as provided at step 520.

At step 530, a weight may be applied to each estimated noise signal $\hat{d}_p[n]$ in the plurality of estimated noise signals in the first signal path. For example, the first set of weights 410 ($W_{pv}$) may be applied to the plurality of estimated noise signals $\hat{d}_p[n]$ to generate a plurality of weighted estimated noise signals $\hat{d}*_p[n]$. As previously described, each weight in the first set of weight 410 may be individually selected and adaptively applied to a corresponding estimated noise signal $\hat{d}_p[n]$ based on current vehicle parameters or conditions, such as engine order frequencies.

At step 540, each estimated noise signal $\hat{d}_p[n]$ in the second signal path may be filtered using a virtual path filter 414 modeled according to a transfer function $H_{pv}[p][v]$ between each corresponding error microphone location ($P_0$, $P_1$, $P_2$, $P_3$) and the virtual microphone location ($V_0$) to generate a plurality of filtered estimated noise signals $\hat{d}'_p[n]$. At step 550, a weight may be applied to each of the plurality of filtered estimated noise signals $\hat{d}'_p[n]$ in the second signal path. For example, the second set of weights 418 ($R_{pv}$) may be applied to the plurality of filtered estimated noise signals $\hat{d}'_p[n]$ to generate a plurality of weighted filtered estimated noise signals $\hat{d}'*_p[n]$. As previously described, each weight in the second set of weight 418 may be individually selected and adaptively applied to a corresponding filtered estimated noise signal $\hat{d}'_p[n]$ based on current vehicle parameters or conditions, such as engine order frequencies.

At step 560, each signal from the first signal path 412 (i.e. unfiltered) and each signal from the second signal path 416 (i.e. filtered) may be combined to generate an estimated virtual microphone noise signal $\hat{d}_v[n]$ indicative of noise at the first virtual microphone location, $V_0$. For instance, the virtual location noise estimator 366 may generate the estimated virtual microphone noise signal $\hat{d}_v[n]$ based on a superposition of the plurality of weighted estimated noise signals $\hat{d}*_p[n]$ from the first signal path 412 and the plurality of weighted filtered estimated noise signals $\hat{d}'*_p[n]$ from the second signal path 416. The weights applied to each filtered and unfiltered signal may adaptively adjust the proportion of each corresponding signal in the final superposition, based on the current vehicle conditions, to obtain the estimated virtual microphone noise signal $\hat{d}_v[n]$.

In addition to providing an accurate estimation of noise at a virtual location where physical microphones are not present, the EOC system 300 may reliably estimate the noise at the virtual location at different frequency ranges in a complex and dynamic acoustic environment. Further, the EOC system 300 may allow the ultimate physical microphone count in a vehicle cabin to be reduced. Many traditional EOC systems rely on dedicated microphones to approximate the location of an occupant's ears. These dedicated EOC microphones are in addition the multiple microphones some vehicles utilize for voice recognition and hands-free telecommunications, which can bring the total to as many as seven or more microphones. Adaptively weighting filtered and/or unfiltered microphone signals and mixing at least some of the signals to provide an accurate estimate of noise at a virtual microphone location remote from the physical microphones may allow the EOC system to utilize other vehicle microphones for EOC purposes. Thus, the system and method of the present disclosure may also reduce the overall vehicle microphone count by re-using at least some existing voice microphones for EOC purposes. This is can further reduce costs and is useful in situations where design requirements dictate fewer microphones, placed in locations that are not traditionally optimal for EOC.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

Those of ordinary skill in the art understand that functionally equivalent processing steps can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of estimating noise at a virtual microphone location for an engine order cancellation (EOC) system, the method comprising:
   receiving a plurality of estimated noise signals indicative of noise at a location of each of a plurality of error microphones, wherein each estimated noise signal is based at least in part on an error signal from each of the plurality of error microphones;
   filtering each estimated noise signal using a virtual path filter modeled according to a transfer function between each corresponding error microphone location and the virtual microphone location to generate a plurality of filtered estimated noise signals;
   adaptively weighting each filtered estimated noise signal using a weight that varies based on current vehicle conditions to generate a plurality of weighted filtered estimated noise signals; and
   generating an estimated virtual microphone noise signal indicative of noise at the virtual microphone location based on a superposition of at least the plurality of weighted filtered estimated noise signals.

2. The method of claim 1, wherein each virtual path filter is a finite impulse response filter.

3. The method of claim 1, wherein each weight is selected from a plurality of weights stored in a lookup table and derived for application to individual filtered estimated noise signals based on the current vehicle conditions.

4. The method of claim 1, wherein the virtual microphone location corresponds to an occupant's ear position.

5. The method of claim 1, further comprising:
   receiving the estimated virtual microphone noise signal at an adaptive filter controller; and
   adjusting an adaptive transfer characteristic of an adaptive filter based in part on the estimated virtual microphone noise signal.

6. The method of claim 1, wherein the current vehicle conditions include a frequency of engine order noise such that each weight varies based at least on the frequency.

7. The method of claim 6, wherein the current vehicle conditions further include at least one of engine load and vehicle speed such that each weight is further selected based on at least one of the engine load and the vehicle speed.

8. The method of claim 1, wherein each of the plurality of estimated noise signals are split into two signals paths including a first signal path and a second signal path, wherein an output of the second signal path includes the plurality of weighted filtered estimated noise signals, the method further comprising:
   adaptively weighting each estimated noise signal in the first signal path using a weight selected based on the current vehicle conditions to generate a plurality of weighted estimated noise signals.

9. The method of claim 8, wherein generating the estimated virtual microphone noise signal indicative of noise at the virtual microphone location based on the superposition of at least the plurality of weighted filtered estimated noise signals comprises:
   generating the estimated virtual microphone noise signal indicative of noise at the virtual microphone location based on a superposition of the plurality of weighted estimated noise signals from the first signal path and the plurality of weighted filtered estimated noise signals from the second signal path.

10. An engine order cancellation (EOC) system comprising:
    at least one adaptive filter configured to generate an anti-noise signal based on an adaptive transfer characteristic and a reference signal received from a reference signal generator, the adaptive transfer characteristic of the at least one adaptive filter characterized by a set of filter coefficients;
    an adaptive filter controller, including a processor and memory, programmed to adapt the set of filter coefficients based on the reference signal and an estimated virtual microphone noise signal indicative of noise at a virtual microphone location; and
    a virtual location noise estimator in communication with at least the adaptive filter controller, the virtual location noise estimator including a processor and memory programmed to:
      receive a plurality of estimated noise signals indicative of noise at a location of each of a plurality of error microphones, wherein each estimated noise signal is based at least in part on an error signal from each of the plurality of error microphones;
      filter each estimated noise signal using a virtual path filter modeled according to a transfer function between each corresponding error microphone location and the virtual microphone location to generate a plurality of filtered estimated noise signals;
      adaptively weight each filtered estimated noise signal using a weight selected and varied based on current vehicle conditions to generate a plurality of weighted filtered estimated noise signals; and
      generate the estimated virtual microphone noise signal indicative of noise at the virtual microphone location based on a superposition of at least the plurality of weighted filtered estimated noise signals.

11. The system of claim 10, wherein each weight is selected from a plurality of weights derived for application to individual filtered estimated noise signals based on the current vehicle conditions.

12. The system of claim 10, wherein the current vehicle conditions include a frequency of engine order noise and each weight varies based at least on the frequency.

13. The system of claim 10, wherein each virtual path filter is a finite impulse response filter.

14. The system of claim 10, wherein each of the plurality of estimated noise signals are split into two signals paths including a first signal path and a second signal path, wherein an output of the second signal path includes the plurality of weighted filtered estimated noise signals, the virtual location noise estimator further programmed to:
    adaptively weight each estimated noise signal in the first signal path using a weight selected based on the current vehicle conditions to generate a plurality of weighted estimated noise signals.

15. The system of claim 14, wherein the virtual location noise estimator is programmed to generate the estimated virtual microphone noise signal indicative of noise at the virtual microphone location based on the superposition of the plurality of weighted estimated noise signals from the first signal path and the plurality of weighted filtered estimated noise signals from the second signal path.

16. The system of claim 15, wherein the virtual microphone location is a fixed point in space, distanced from the plurality of error microphones, corresponding to an occupant's ear position.

17. A method of estimating noise at a virtual microphone location for an engine order cancellation (EOC) system, the method comprising:
- receiving a plurality of estimated noise signals indicative of noise at a location of each of a plurality of error microphones, wherein each estimated noise signal is based at least in part on an error signal from each of the plurality of error microphones;
- transmitting each estimated noise signal along a first signal path and a second signal path;
- applying a weight to each estimated noise signal in the first signal path, each weight being individually selected and varied based on current vehicle conditions, to generate a plurality of weighted estimated noise signals;
- filtering each estimated noise signal in the second signal path using a virtual path filter modeled according to a transfer function between each corresponding error microphone location and the virtual microphone location to generate a plurality of filtered estimated noise signals;
- applying a weight to each filtered estimated noise signal in the second signal path, each weight being individually selected and varied based on current vehicle conditions, to generate a plurality of weighted filtered estimated noise signals; and
- generating an estimated virtual microphone noise signal indicative of noise at the virtual microphone location based on a superposition of the plurality of weighted estimated noise signals from the first signal path and the plurality of weighted filtered estimated noise signals from the second signal path.

18. The method of claim 17, wherein a proportion of each signal applied in the superposition is adaptively controlled by its corresponding weight based on the current vehicle conditions.

19. The method of claim 18, wherein the current vehicle conditions include a frequency of engine order noise such that each weight is individually selected and varied based at least on the frequency.

20. The method of claim 17, wherein the virtual microphone location corresponds to an occupant's ear position.

* * * * *